United States Patent [19]

Cates

[11] Patent Number: 4,683,101

[45] Date of Patent: Jul. 28, 1987

[54] CROSS FLOW EVAPORATIVE COIL FLUID COOLING APPARATUS AND METHOD OF COOLING

[75] Inventor: Robert E. Cates, Arnold, Md.

[73] Assignee: Baltimore Aircoil Company, Inc., Jessup, Md.

[21] Appl. No.: 813,489

[22] Filed: Dec. 26, 1985

[51] Int. Cl.⁴ ............................................. B01F 3/04

[52] U.S. Cl. ................................. 261/146; 261/153; 165/175; 165/113

[58] Field of Search ............... 261/153, 146, DIG. 77; 165/175, 112, 113

[56] References Cited

U.S. PATENT DOCUMENTS

| | | | |
|---|---|---|---|
| 2,196,771 | 4/1940 | Kitto | 261/153 |
| 2,247,514 | 7/1941 | Mart | 261/DIG. 11 |
| 2,443,703 | 6/1948 | Christensen | 165/175 |
| 2,615,686 | 10/1952 | Davidson | 261/153 |
| 3,424,235 | 1/1969 | Schoonman | 165/175 |
| 3,747,673 | 7/1973 | Jones et al. | 165/112 |
| 3,925,523 | 12/1975 | Cates | 261/DIG. 77 |
| 4,112,027 | 9/1978 | Cates | 261/DIG. 11 |
| 4,292,958 | 10/1981 | Lee | 165/175 |

FOREIGN PATENT DOCUMENTS

| | | | |
|---|---|---|---|
| 55-69279 | 2/1953 | Japan . | |
| 1370321 | 10/1974 | United Kingdom | 165/113 |

*Primary Examiner*—Tim Miles

*Attorney, Agent, or Firm*—Charles E. Bouton; Edward J. Brosius

[57] ABSTRACT

A closed circuit evaporative fluid cooler/evaporative condenser utilizing a cross flow water-air fluid flow relationship is provided. An evaporative liquid recirculating system includes a liquid distribution spray assembly mounted above a bundle of fill sheets. A closed circuit fluid cooling/condensing heat exchanger is supported below the bundle of fill sheets. Each heat exchanger comprises a plurality of parallel coil circuits or modules, wherein the inlet of each coil circuit is at a higher elevation adjacent the air outlet side of the heat exchanger, and the fluid outlet manifold of each coil circuit is at the lowest elevation adjacent the air inlet side of the heat exchanger. This arrangement assures the coolest liquid falling from the fill sheet assembly contacts the coil assembly containing the coolest fluid and that the coolest air entering the air inlet contacts the coil assembly portion containing the coolest fluid. Each coil assembly comprises a plurality of parallel individual coil circuits each having downwardly sloped straight runs connected by return bends to assure the complete pass through and drainage of the fluid therein.

11 Claims, 6 Drawing Figures

CROSS FLOW EVAPORATIVE COIL FLUID COOLING APPARATUS AND METHOD OF COOLING

BACKGROUND OF THE INVENTION

The present invention relates generally to cooling towers and, more specifically, to a crossflow evaporative heat and mass exchanger and coil module apparatus used for evaporative closed circuit fluid cooling or evaporative condensing purposes.

In an induced draft crossflow or doubleflow cooling tower, a fan is mounted in the roof outlet of the tower. This fan draws or induces air flow inwardly into the cooling tower through a sidewall or opposite sidewalls of the tower. Water or other evaporative liquid to be cooled is pumped to the top of the cooling tower structure and distributed through a series of spray nozzles. These spray nozzles emit a diffused spray of the water across the top of an appropriately selected fill media. Such fill most typically comprises a bundle of generally spaced parallel plastic sheets across each of which the water spray is dispersed and downwardly passed by gravity. The large surface area across which the water is dispersed on such sheets leads to good cooling by the induced airflow directed between such sheets. The cooled water is collected in a sump and passed through to the desired cooling system wherein it will become heated and then pumped back to the cooling tower.

A modification to such induced draft cooling tower is shown in U.S. Pat. No. 4,112,027. In that patent, the addition of a series of serpentine heat exchange conduits is provided beneath the bundle of fill sheets. A hot fluid to be cooled enters the heat exchange conduits through an inlet header at the lower or bottom edge of such conduits with the cooled fluid exiting the conduits through a header joining the upper ends of the conduits.

Accordingly, the hot fluid to be cooled enters at the lower end of the conduits and travels upwardly therethrough in primarily a counterflow relationship to the external cooling water dropping downwardly by gravity from the fill sheets. The cooling water passing downwardly over the fill sheets and over the external surfaces of the heat exchange conduits is collected in a sump below the conduits and pumped directly back upwardly to the discharge spray assembly. A stated purpose of this cooling tower assembly is to have the coldest fluid which has been cooled during upward travel through the serpentine conduit to come into indirect thermal interchange with the coldest water exiting the fill assembly. It has previously been assumed that the coldest water occurred falling across the lower edges of the fill sheets as at that area the water has not been previously subject to indirect heating by the fluid in the conduit. The stated purpose is to assure that the fluid temperature in the heat exchange conduit approaches that of the cold water exiting the fill as opposed to approaching the temperature of heated water adjacent the lower ends of the conduits. However, the present invention utilizes a condition not previously recognized in that there is a water temperature gradient across the fill sheets with the coolest water occurring at the air inlet side.

U.S. Pat. No. 4,112,027 fails to take into account the fact that there is a temperature differential in the water discharged from the fill bundle when measuring the temperature at the air inlet side of the fill bundle as opposed to the internal air outlet side of the fill bundle. Warmer water by 6°–10° F. exits the fill bundle on the internal air outlet side of the fill bundle as opposed to the external air inlet side. Accordingly, in U.S. Pat. No. 4,112,027 wherein cooled fluid exiting the coil heat exchanger along the top outlet header directly below the fill bundle is, in fact, not exposed to the coldest possible water from the fill bundle as desired. In the coil heat exchanger of the present invention, the warmest liquid to be cooled enters the coil heat exchanger at the internal or air outlet side of the coil heat exchanger through the inlet manifold. The warmest fluid to be cooled at the inlet of the heat exchanger is exposed to the warmest water discharged from the fill bundle. As the liquid to be cooled flows through the serpentine coil assemblies of the heat exchanger in a generally downward and outwardly fashion toward the air inlet side of the cooling tower, the increasingly cooled fluid is exposed to cooler water falling from the fill bundle until finally, when the liquid to be cooled reaches the outermost portion of the heat exchanger adjacent the air inlet side of the cooling tower and at the outlet manifold of the heat exchanger, in fact, the coolest liquid flowing through the heat exchanger is in indirect contact with the coolest water falling from the fill bundle and with the coolest outside air entering the air inlet of the cooling tower.

A major concern in any evaporative heat exchanger or coil heat exchanger is to ensure that the working fluid or internal fluid coolant completely passes through all of the conduit sections without accumulating at any one location. Such accumulation could, in the event of coil shutdown in winter weather, lead to the freezing, expansion and rupture of such conduit section. In U.S. Pat. No. 4,112,027, this tube drainage is accomplished by the generally vertical placement of each serpentine coil section with each run or length thereof sloped at a downward angle. In Japanese Patent Publication No. 55-69279, an attempt at such downward slanting is made, but a study of the publication indicates that the lengths or runs of the conduit remain level while the bend or U-sections are slanted downwardly. This would be ineffective in assuring the complete exit of fluid from the conduit. Further, rows of fill material between tube coils are shown in this publication. Such an arrangement is undesirable due to its inability to properly distribute the falling water and inlet air, and the excessive cost and number of parts required to assemble such a configuration.

Another problem in U.S. Pat. No. 4,112,027 is that the entire coil heat exchanger must be installed as a single unit. This is undesirable due to both the large size and weight of the coil heat exchanger unit. Further, the particular capacity desired for the coil heat exchanger must be established upon the initial construction of the coil heat exchanger and cannot be modified hereafter. As such units frequently are installed on the rooftops of buildings, it is desirable to decrease the size and weight of such units, or at least enable the coil heat exchanger to be assembled on a modular basis at the actual installation location.

SUMMARY OF THE INVENTION

It is an object of the present invention to provide a cooling tower utilizing a crossflow water/air fluid flow relationship with a fill evaporative assist and a closed circuit fluid cooling or evaporative condensing modular coil section.

In a mechanical draft cooling tower of the induced draft crossflow type having either a single air entry passage or two air entry passages with a single fan plenum chamber similar to that described above, the water sprayed downwardly onto the fill bundle spreads and trickles down the fill sheets and is cooled by the air draft flowing inwardly through the inlet face of the cooling tower.

In the cooling tower, in accordance with the present invention, a tubular coil heat exchanger comprising a plurality of coil assemblies or modules, is provided beneath each fill bundle. Each coil module is comprised of a series of parallel serpentine coils extending at a slight angle to horizontal and in a vertical stacked arrangement. The straight lengths (or runs) of such serpentine coils run crossways to the air inlet face of the cooling tower. The entire module is installed at an angle in the cooling tower and each of the serpentine coils is arranged in the module such that each straight length of the coil slopes downwardly in each of its crossward runs in the module and, therefore, also descends stepwise after each bend. The connecting bends are about level when the module is installed at an angle in the cooling tower. The appropriate piping is provided along with an inlet manifold structure to provide hot liquid or fluid to be cooled to each of the coil heat exchanger module sides which are located at the upper sloped end of the coil module and at the side of the coil heat exchanger facing the fan outlet internal area of the cooling tower. Appropriate outlet piping with a collection manifold is provided adjacent each inlet face or side of the cooling tower such that cooled fluid having passed downwardly through the serpentine coils of each heat exchanger module is collected at the downwardly sloped side of each heat exchanger module.

An additional advantage of the modular arrangement of the coil assemblies of the heat exchanger of the present invention is that these assemblies may be more readily hoisted to a rooftop installation where they can conveniently be stacked and assembled in the final cooling tower arrangement. Further, the desired capacity of the cooling tower can be readily adjusted by using increased or decreased numbers of such modular coil assemblies in the design of the cooling tower. Such modular coil assemblies can be manufactured in the factory environment and kept in stock with the desired number being designed for installation in the required capacity cooling tower arrangement. Of course, if desired, a single module assembly could be manufactured to the required size, and utilized as the entire desired heat exchanger. Another advantage of the present invention is that due to the down sloping and staggered arrangement of the coil sections of the coil assembly heat exchanger, the air flow into the coil assembly is of high efficiency with good heat exchanging properties. This is opposed to a coil heat exchanger wherein all coil elements of a particular row are in line with each other thereby lessening the efficiency of heat exchange due to the air inflow.

DESCRIPTION OF THE PREFERRED EMBODIMENT

Figure 1:
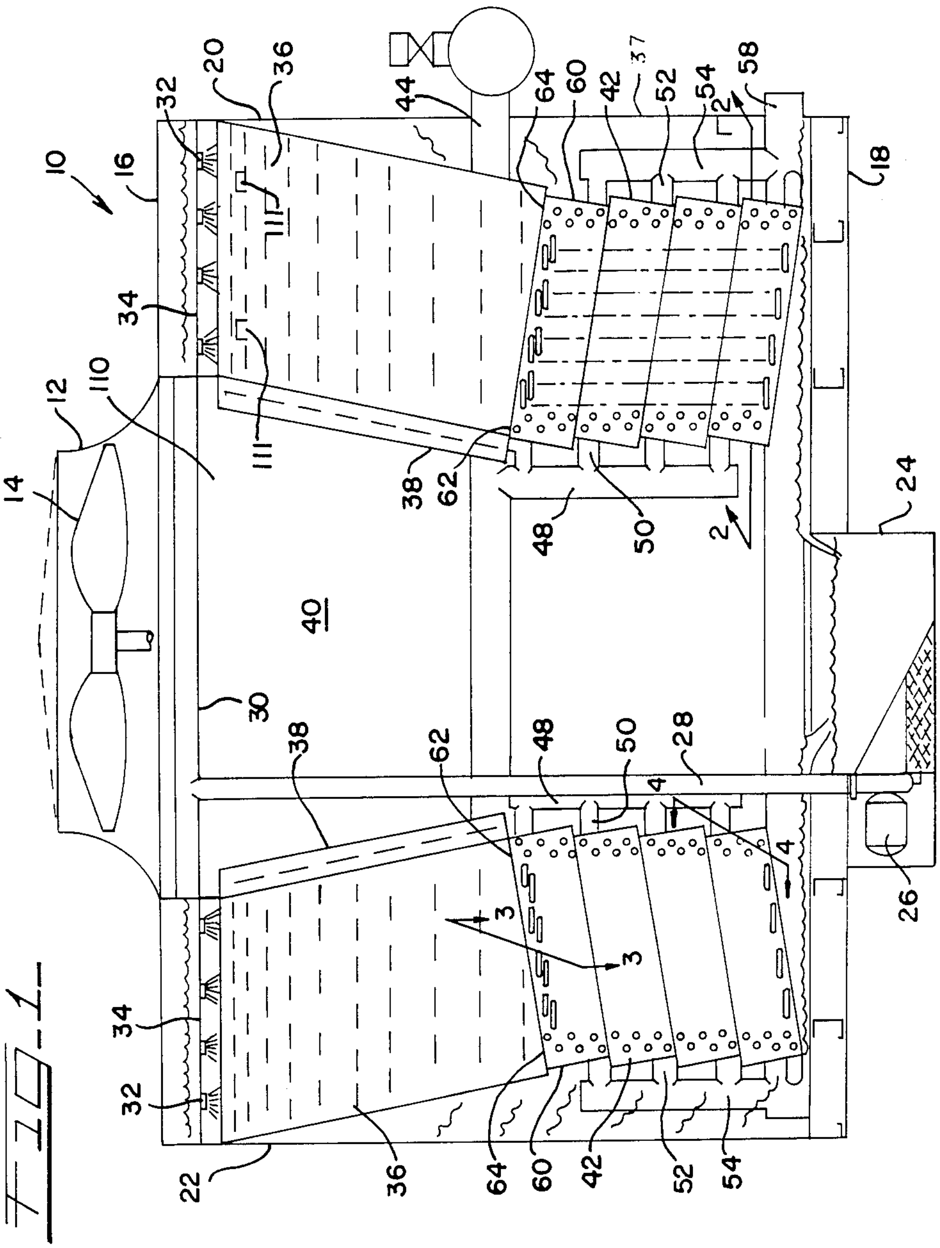
FIG. 1 is a side view in partial cross section of a cooling tower in accordance with the present invention.

Referring now to FIG. 1 of the drawings, a cooling tower is shown generally at 10 and comprises an upper outlet fan enclosure 12 housing a fan 14 therein. Cooling tower 10 is of a generally rectangular shape, comprising an upper surface or roof 16, sidewalls 110 which span the full distance between louvered end openings 20 and 22, and a base structure 18. Fan 14 induces a draft outward from the fan enclosure 12 drawing air inwardly from cooling tower louvered ends 20 and 22. Cooling tower ends 20 and 22 contain similar elements which are numbered identically.

Cooling water or other chosen fluid is collected along the upper surface structure of base 18 and spills into collection sump 24. Pump 26 sends cooling water from sump 24 upward through piping 28 into distribution pipe 30. Distribution pipe 30 empties into water distribution containers 34 on either end of cooling tower 10. It will be understood that identical numbers will be used to identify identical components at each end 20 and 22 of cooling tower 10. Cooling water from distribution container 34 exits through spray nozzles 32 downwardly onto fill bundle 36. Fill bundle 36 comprises a plurality of plastic sheets hung from beams 111 supported at ends by brackets attached to sidewalls 110. Each of the sheets comprising fill bundle 36 is comprised of polyvinyl chloride material having a generally wavy and grooved pattern on both sides thereof to aid in the spreading, rundown and, thusly, the cooling of water exiting from spray nozzles 32. Drift eliminator 38 assures that cooling water in the fill region 36 does not enter air outlet chamber 40 centrally located in cooling tower 10. Generally, drift eliminator 38 comprises a series of closely spaced plastic louvres which, while permitting air flow therethrough, will collect water particles thereon thereby assuring their falling downwardly onto further fill material there below, eventually gravitating to water collection means 24.

A coil heat exchanger assembly 42 is located below each fill bundle 36. Fluid to be cooled enters cooling tower 10 through conduit 44 and flows downwardly through manifolds 48 and through manifold inlets 50 into each coil assembly module 60 of coil heat exchanger 42. Cooled liquid, having passed through coil heat exchangers 42 exits each coil assembly module 60 through outlet 52 into outlet manifold 54 and exits cooling tower 10 through outlet conduit 58. Due to the increased cooling due to the lower temperature of air input adjacent ends 20, 22 of cooling tower 10, water exiting fill 36 at air input end 64 will be cooler by 6°–10° F. than water exiting fill 36 at internal ends 62 inward from ends 20, 22. Air input end 37 may include a damper to close off air flow to coil heat exchanger 42 for operation of the cooling tower when it is desired to operate only with the air inlet to the fill section of the cooling tower. Further, air input end 64 may include a perforate panel to further close off coil heat exchanger 42 from the air inlet to the fill section.

Referring now to FIGS. 1, 2, 3 and 4, the tubing of an individual coil module 60 will be explained in detail.

Coil module 60 comprises six separate serpentine coil paths, numbered 72, 74, 76, 78, 80 and 82. Inlet manifold 48 through connector 50 supplies liquid to be cooled to module inlet manifold 70 through module connector 51. In turn, supplies of fluid to be cooled are inlet to individual serpentine inlet coils 72, 74, 76, 78, 80 and 82. Module manifold 70 is connected in communication with similar inlet manifolds of further modules stacked below module 60. Cooled liquid flows into module outlet manifold 71 through module connector 53 into outlet connection 52 to cooled liquid outlet manifold 54. Structural supports 90, 92 and 94 insure proper spacing of the individual coils and hold the coils in the desired slanted configuration as will be described. Note that in FIG. 2, the coil module 60 is shown slanted at the desired angle of installation as shown in FIG. 1. In such arrangement, each coil or tube, such as 72, has straight lengths or runs 104, 106 which are inclined at a downward angle to insure complete flow therethrough and generally level U-bends 102, 98 connecting the straight lengths. Each coil is preferably comprised of copper, but other suitable metals or alloys can be utilized. Certain non-metallic compositions, such as plastics, could also be utilized.

Figure 5:
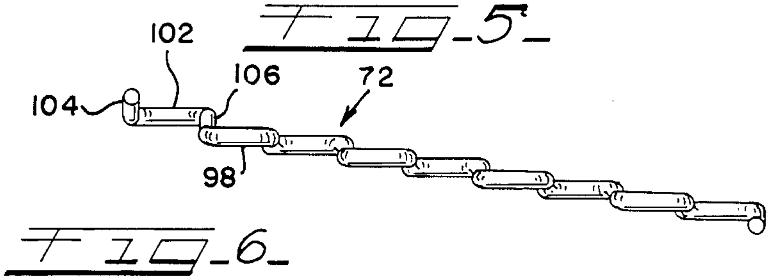
FIG. 5 is a side view of one tube of a coil module of the present invention.
Figure 6:
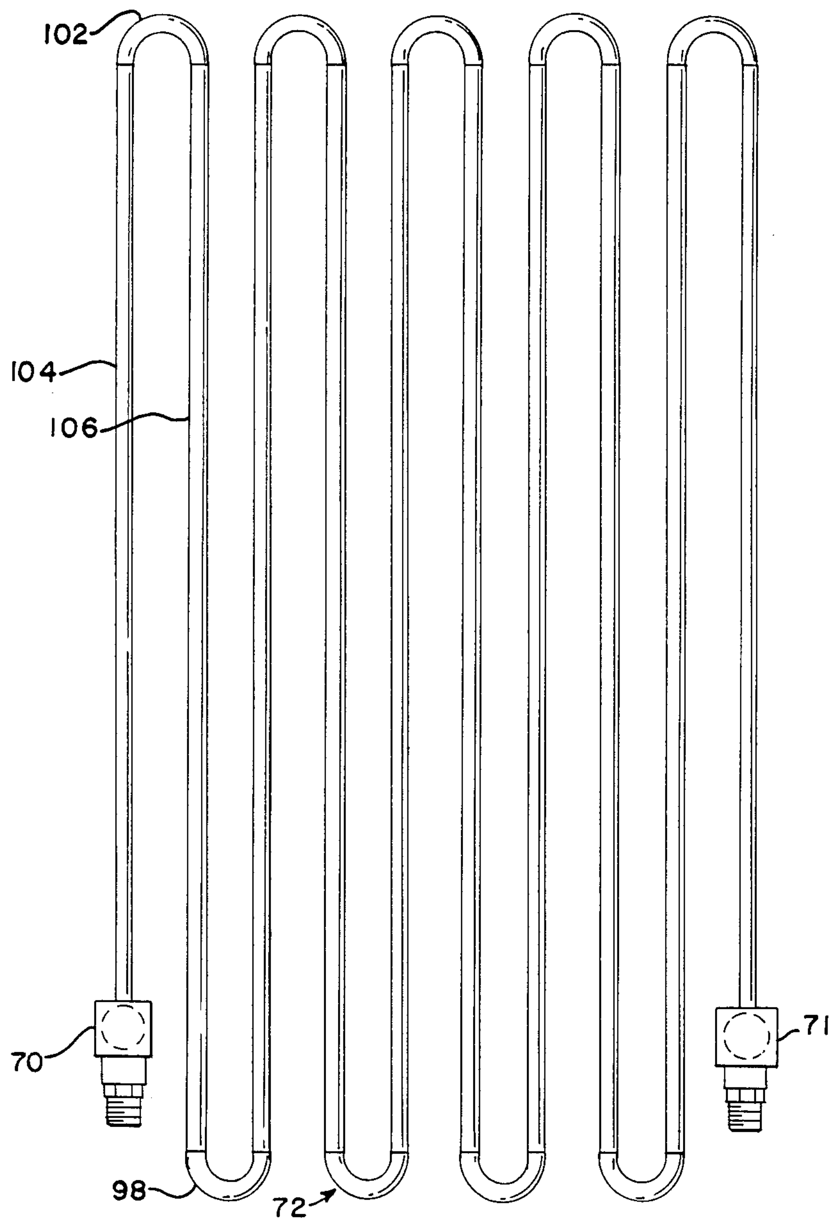
FIG. 6 is a top view of one tube of a coil module of the present invention.

Referring to FIGS. 5 and 6, a detailed view of one coil circuit or tube such as 72 is shown. Tube 72 is comprised of straight lengths 104, 106, etc., which are connected by U-bends or end sections 98, 102, etc. As installed in the cooling tower, and as shown in the side view of FIG. 5 which corresponds with the side view shown in FIG. 2, the straight lengths 104, 106 are inclined downwardly from module inlet manifold 70 toward outlet manifold 71. This insures the complete downward and outward flow of the fluid to be cooled through the heat exchanger module tubing when drainage of the heat exchanger is required such as during equipment shutdown periods. The U-bend sections such as 98, 102 are generally level when installed, but experience has shown that due to the much greater length of the straight section of each tube, the fluid flow drainage is complete therethrough.

Figure 3:
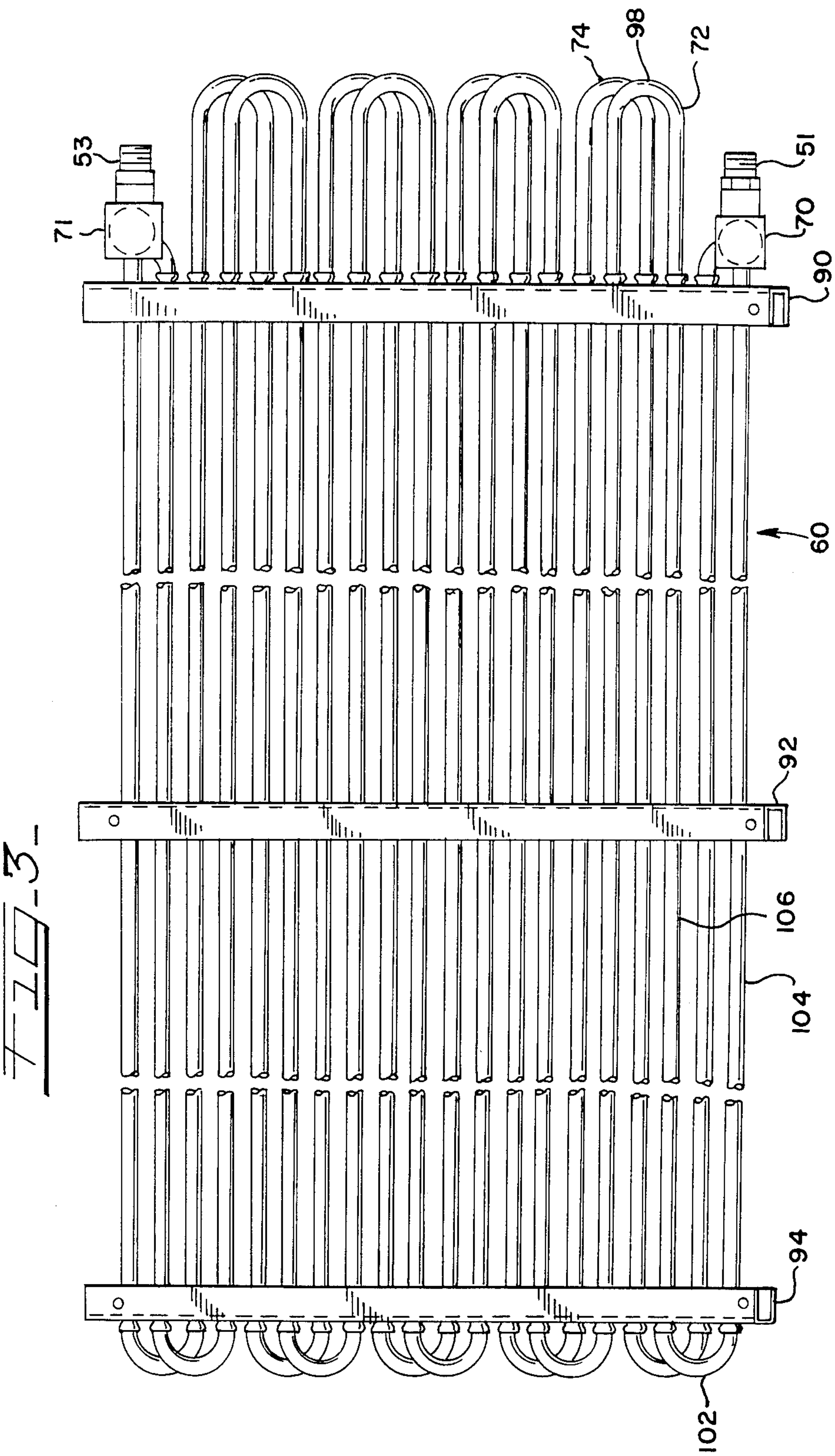
FIG. 3 is a top view of a heat exchanger coil module in accordance with the present invention.

Referring now to FIG. 3, in one preferred method of assembling each module 60, the tube lengths such as 104, 106 are run through properly arranged openings in supports 90, 92 and 94. Preferred U-bends such as 98, 102 are then affixed onto the ends of the lengths to form complete separate tube or coil circuits such as 72, 74, etc. Manifolds 70, 71 are affixed onto the ends of tubes 72, 74, etc. and the complete module is formed, in this example of six parallel flow circuits per module.

Figure 4:
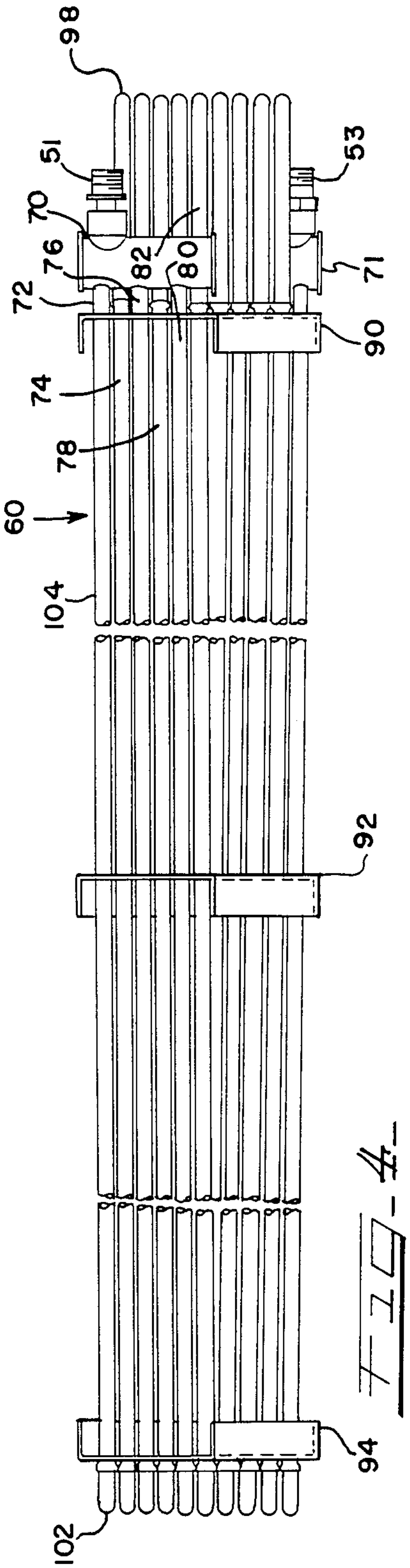
FIG. 4 is a front end view of a heat exchanger coil module in accordance with the present invention.
Figure 2:
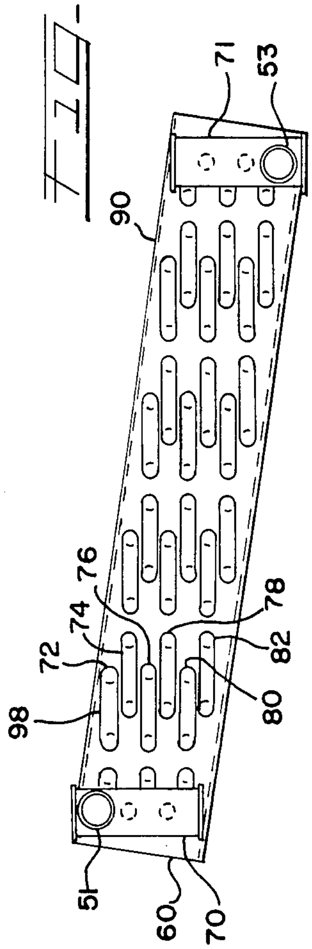
FIG. 2 is a side view of a heat exchanger coil module in accordance with the present invention.

All of the tubes 72, 74, etc. are not visible in FIG. 3 because that top view of a module 60 is looking at the module as inclined and installed as in FIG. 1. Note that all tubes are vertically aligned in FIG. 1. However, for improved air cooling due to the air entering sides 20 and 22 of FIG. 1, the individual tubes 72, 74, etc. throughout their entire run, are not horizontally aligned and as seen in FIG. 4. Accordingly, the air passing inwardly from sides 20, 22 of cooling tower 10 is presented with many different tube surfaces not one behind the other, which aids cooling of the fluid in tubes 72, 74, etc.

What is claimed is:

1. A cross flow cooling tower comprising an enclosure having an air inlet at an outer side thereof and an air outlet at an inner side thereof, a bundle of fill sheets supported from the enclosure sidewalls adjacent an air inlet, spray distribution means to supply evaporative liquid downwardly through said bundle of fill sheets, means causing a draft of air in through the air inlet and across said fill sheets and out through said air outlet cross current to said evaporative liquid, and a plurality of fluid conduit means supported below said bundle of fill sheets in the path of said evaporative liquid, each of the fluid conduit means connected to an input manifold adjacent said air outlet to receive a fluid to be cooled and to an exit manifold adjacent said air inlet to permit the cooled fluid to exit the fluid conduit assemblies whrein the liquid draining downwardly from the fill sheets is cooled by the air flow into the air inlet, and the fluid conduit means receive the fluid to be cooled at their upper section adjacent said air outlet such that the warmest water draining from the fill first contacts the fluid conduit means which contain the warmest incoming internal fluid, and wherein said exit manifold receives cooled fluid adjacent the air inlet such that the coolest fluid falling from the fill sheet bundle contacts the portion of the fluid conduit means containing the coolest fluid and that the coolest air entering the air inlet contacts the portion of the fluid conduit means containing the coolest fluid.

2. The cooling tower of claim 1 wherein each fluid conduit means comprises a plurality of modules, each module including multiple parallel circuits each having straight runs connected by return bends, each module being mounted at a sloped angle in said frame such that the straight runs are at a downward slope toward the exit manifold.

3. The cooling tower of claim 1 wherein each fluid conduit means comprises multiple parallel circuits each having straight runs connected by return bends, the conduit means mounted such that the straight runs are at a downward slope toward the exit manifold.

4. The cooling tower of claim 1 wherein the fluid conduit means comprises serpentine tubes of alternating runs and bends with the bends positioned substantially horizontally and successively turned in opposite directions and with the intervening runs at a slight decline, in the direction of fluid flow, so as to progress in descending steps from said input manifold to said output manifold.

5. A method of cooling a liquid comprising the steps of providing a frame assembly with a cross draft mechanism having an air inlet side and an air outlet side, spraying liquid from nozzles at the top of said frame assembly downward to a collection sump and pumping said liquid from the sump upwardly to said nozzles, providing a sheet fill assembly under the liquid spray, and providing a coil assembly forming a heat exchanger below said sheet fill assembly, connecting an input of said coil assembly to a source of fluid to be cooled and an output of said coil assembly to an outlet to receive cooled fluid exiting the cooling tower, wherein the input of said coil assembly is located in close proximity to said air outlet side of said frame assembly and said outlet of said coil assembly is located in close proximity to said air inlet side of said frame assembly to assure that the warmest air at the outlet side of said frame assembly initially contacts the warmest fluid near the input of said coil assembly and that the coolest air at the input side of said frame assembly initially contacts the coolest fluid near the output of said coil assembly.

6. The method of claim 5 wherein said coil assembly is comprised of a plurality of modules each of which includes multiple parallel coil circuits each having straight runs connected by return bends, each module mounted on a sloped angle such that the straight runs are at a downwardly sloping angle.

7. The method of claim 5 wherein said coil assembly is comprised of multiple parallel coil circuits each having straight runs connected by return bends, the coil assembly mounted such that the straight runs are at a downwardly sloping angle.

8. A mechanical draft cooling tower comprising
an air inlet and an air outlet,
a liquid spray assembly adapted to spray liquid downwardly between said air inlet and said air outlet,
a fill sheet assembly mounted beneath said liquid spray assembly,
a coil assembly mounted beneath said fill sheet assembly, said coil assembly adapted to receive a fluid to be cooled and to outlet said fluid after cooling,
wherein said coil assembly receives said fluid to be cooled adjacent said air outlet such that the warmest liquid falling from said fill sheet assembly contacts the portion of the coil assembly containing the warmest fluid,
and wherein said coil assembly outlets said cooled fluid adjacent said air inlet such that the coolest liquid falling from the fill sheet assembly contacts the portions of the coil aasembly containing the coolest fluid and that the coolest air entering the air inlet contacts the portion of the coil assembly containing the coolest fluid.

9. The cooling tower of claim 8 wherein each coil assembly comprises a plurality of coil modules, each coil module comprising multiple parallel circuits each having straight runs connected by return bends, each module being mounted in the cooling tower such that the straight runs are at a downward slope toward the fluid outlet.

10. The cooling tower of claim 8 wherein said coil assembly comprises a plurality of coil modules and an inlet manifold is utilized to provide fluid to be cooled to each of the coil modules at their upper ends such that the warmest water from the fill sheet assembly drains onto the coil module portion containing the warmest fluid to be cooled.

11. The cooling tower of claim 10 wherein said inlet manifold inputs fluid to said coil modules at the side of said coil modules opposite from the air inlet side of said cooling tower.

* * * * *